Aug. 29, 1933.  L. R. MILLER  1,924,617
LATEX GLOVE
Filed March 21, 1931
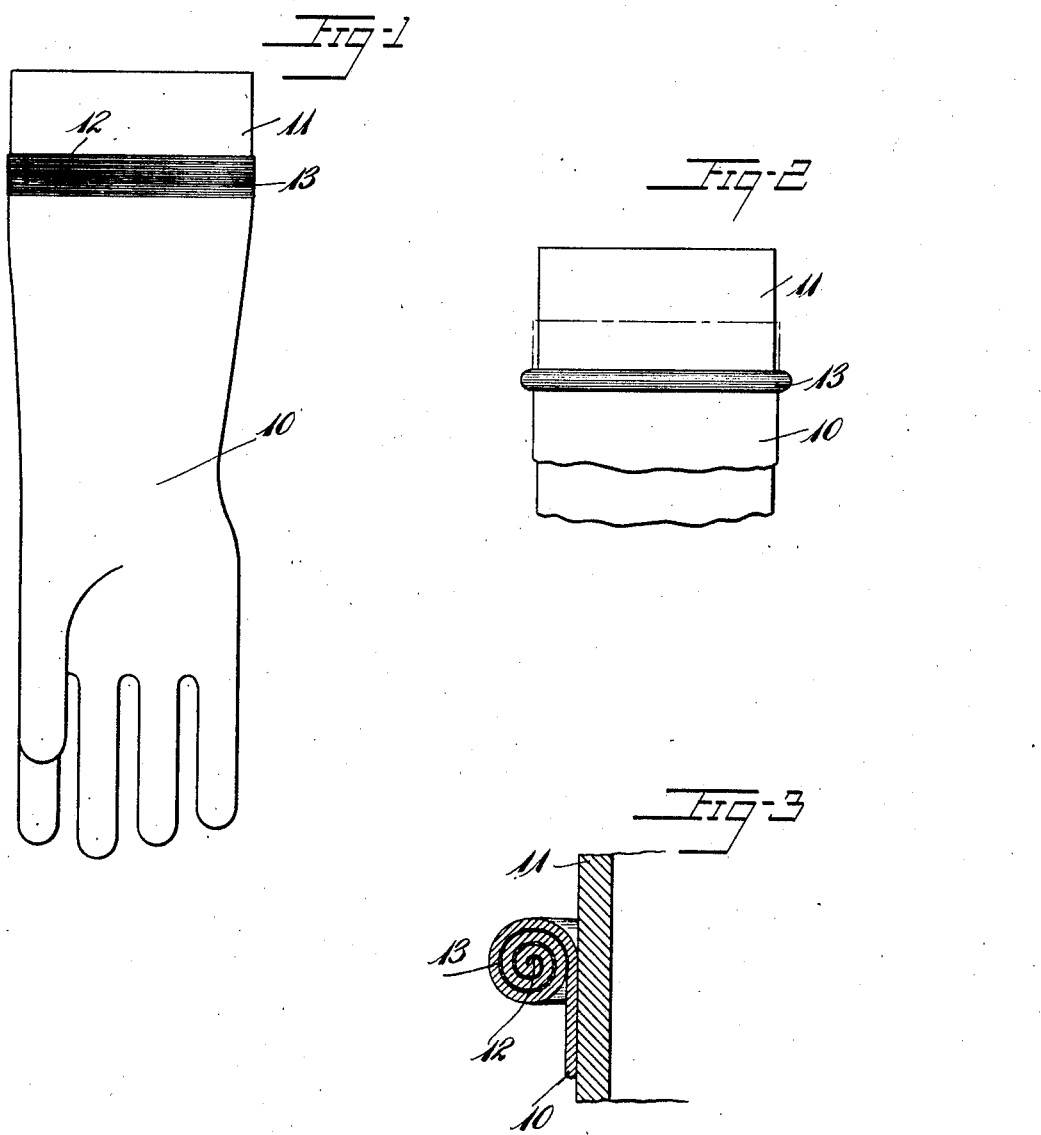

Patented Aug. 29, 1933

1,924,617

UNITED STATES PATENT OFFICE 1,924,617

LATEX GLOVE

Lee R. Miller, Akron, Ohio, assignor to The B. F. Goodrich Company, New York, N. Y., a corporation of New York Application March 21, 1931. Serial No. 524,401

11 Claims. (Cl. 154—2)

This invention relates to the manufacture of relatively thin translucent rubber articles, such as are made directly from aqueous dispersions of rubber, preferably containing the usual compounding, vulcanizing, activating, accelerating and preservative ingredients, and more particularly to the edge finish or trim on such articles, as for example at the wrists of thin rubber gloves so manufactured.

In the manufacture of thin rubber articles, it is practically essential to reenforce the edges of the adticles against tear and undue stretching, and this is commonly accomplished by adhering an additional rubber band to the article at its edge or in case of thinner articles by rolling the rubber on itself in several convolutions while the rubber is still in an adhesive state.

The purpose of this invention is to provide an attractive edge-finish to thin rubber articles and at the same time accomplish a suitable reenforcing of the article at its edges, and is especially adapted to the edge-trimming of articles made directly from aqueous dispersions of rubber, such as latex, which articles are very light in color and are highly translucent.

Briefly, the invention comprises applying to the rubber article adjacent the edge to be finished a band of a material of contrasting color and then rolling the rubber from the edge upon itself so as to form at the edge a convolute roll having the color of the applied band.

The invention in its fuller aspects is set forth in the following description which is illustrated by the accompanying drawing in which Fig. 1 is a view in elevation of a rubber glove upon a form with the band of contrasting color applied thereto;

Fig. 2 is a view in elevation of the glove of Fig. 1 after the edge has been rolled; and Fig. 3 is an enlarged fragmentary cross-sectional view of the edge-roll shown in Fig. 2.

Referring to the drawing, a thin rubber article 10, such as a rubber glove, is disposed on a form 11, which may be the form on which the article was made or a special form on to which the article is drawn to facilitate the operation. It will be understood that the form 11 is not essential to the invention but is a convenient instrumentality for use in connection therewith.

Preferably the article 10 is made by dipping the form 11 in an aqueous dispersion of rubber, such as latex, which may be either in its natural condition or concentrated or thickened and/or admixed with compounding, vulcanizing, activating, accelerating and/or preservative ingredients. It will be obvious to those skilled in the art that in lieu of dipping such methods as spraying, spreading, brushing and other equivalent methods may be employed for forming the rubber article 10. Where latex is employed the resulting article 10 is highly translucent, objects placed against one surface being plainly visible from the other surface of the article. The rubber of the article does, however, have a slight yellowish cast.

The edge 12 of the article 10 is preferably smooth and of the outline desired in the finished article, and in certain cases it may be desirable to trim the edge to remove ragged or excess portions formed in the process of manufacture. A band or layer 13 of a suitably colored material is applied to the rubber adjacent to the edge 12 and preferably in such manner that the inner edge of the band 13 is about parallel to the edge 12.

The band or layer 13 may be applied to the article 10 in any convenient manner. For example, a colored ink may be painted on the glove as by brushing, spraying, rolling etc. For this purpose colored rubber cements are also particularly advantageous. Alternatively, a thin rubber of colored material may be wrapped about the article, while the rubber of the article is still soft and tacky, or it may be applied by means of a suitable adhesive cement to the article at any time.

When the band or layer 13 has been applied to the article 10 in the position shown in Fig. 1, the edge 12 is rolled, either by hand or by a special machine designed for this purpose, so as to form a closely wound convolute, such as is shown in the greatly magnified section in Fig. 3, the band 13 being either the inner or the outer layer of the convolute. It is desirable that the band 13, or the rubber of the article 10, or both, be in a tacky or adhesive condition during the rolling operation, and such condition is normally present where the rolled-edge finishing operation is carried out while the rubber and band are still in a tacky adhesive condition. If necessary, however, a suitable adhesive can be applied to the band or the rubber, or both, prior to the convoluting operation.

In commercial operations, the article is processed to give the above described rolled-edge finish prior to vulcanization, but the operation may if desired be carried out after the vulcanization of the article.

It has been found that most pleasing results are obtained when strong or contrasting colors are employed. Thus, red, blue, green, brown, orange and other strong colors stand out in the finished product with unusual clarity. The term "contrasting color" as herein used is intended to include all colors except those which are so nearly like the color cast of the rubber as not to offer a noticeable color contrast.

While the preferred embodiment of my invention has been hereinabove described in connection with a glove, it is to be understood that the operation is equally applicable to the edge trimming of finger cots, stems of rubber balloons, and other articles. It will also be appreciated that the exact procedure herein set forth is subject to numerous variations and modifications and that materials named may suggest other materials that may be employed, all without departing from the invention as defined in the appended claims.

I claim:

1. The method of edge-finishing a thin translucent rubber article which comprises applying to the rubber adjacent the edge to be finished a coating of colored material, and rolling the edge portion of the rubber upon itself so as to impart to the rolled portion the color of the coating.

2. The method of edge-finishing a thin translucent rubber article which comprises applying to the rubber adjacent the edge to be finished a coating of adhesive colored material, and while said coating is still adhesive rolling the edge portion of the rubber upon itself so as to impart to the rolled portion the color of the adhesive material.

3. The method of edge-trimming a thin translucent rubber article which comprises applying to the rubber adjacent the edge a band of colored material, and rolling the edge portion of the rubber upon itself so as to enclose colored material within the convolutions of the rolled edge.

4. The method of edge-trimming a thin translucent rubber article which comprises applying to the rubber on the outer surface of the article and adjacent the edge to be trimmed a band of adhesive colored material, and while said coating is still adhesive, rolling the edge portion of the rubber upon itself so as to enclose colored material within the convolutions of the rolled edge.

5. The method of edge-finishing thin translucent rubber article which comprises applying to the rubber adjacent the edge to be finished a band of adhesive material, and rolling the rubber upon itself so as to enclose the adhesive material within the convolutions of the rolled edge.

6. The method of edge-finishing a thin translucent rubber glove which comprises applying to the rubber adjacent the edge to be finished a band of rubber ink, and rolling the rubber upon itself so as to enclose rubber ink within the convolutions of the rolled edge.

7. The method of edge-finishing a thin translucent rubber glove which comprises applying to the rubber adjacent the wrist opening a band of colored rubber cement, and while the cement is still tacky rolling the edge portion of the rubber upon itself so as to enclose colored cement within the convolutions of the rolled edge.

8. A thin translucent rubber article having a rolled edge comprising contrasting colored material.

9. A thin translucent rubber article having a rolled edge enclosing within its convolutions a contrasting colored material.

10. A rubber glove having a rolled edge at the wrist opening comprising contrasting colored material.

11. A thin translucent rubber article having a rolled edge, the convolutions of which are adhered one to another by a thin layer of rubber of contrasting color.

LEE R. MILLER.